United States Patent [19]

Piliero

[11] Patent Number: 5,120,928
[45] Date of Patent: Jun. 9, 1992

[54] INSTALLATION FOR THE LASER MARKING OF THE SURFACE OF A CHEESE OR DELICATESSEN FOOD PRODUCT

[75] Inventor: Rocco Piliero, Aze, France

[73] Assignee: Bongrain SA, Guyancourt, France

[21] Appl. No.: 586,946

[22] Filed: Sep. 24, 1990

[30] Foreign Application Priority Data

Oct. 4, 1989 [FR] France .................. 89 12982

[51] Int. Cl.⁵ ............................................. B23K 26/16
[52] U.S. Cl. .......................... 219/121.68; 219/121.84
[58] Field of Search ............... 219/121.68, 121.69, 219/121.72, 121.77, 121.82, 121.84, 121.67, 121.85; 346/76

[56] References Cited

U.S. PATENT DOCUMENTS

| | | |
|---|---|---|
| 4,410,968 | 10/1983 | Frohbach et al. ............ 219/121.6 X |
| 4,486,645 | 12/1984 | Jedlicka et al. .............. 219/121.72 |
| 4,791,267 | 12/1988 | Yokoyama et al. .......... 219/121.69 |

FOREIGN PATENT DOCUMENTS

| | | |
|---|---|---|
| 0031239 | 7/1981 | European Pat. Off. . |
| 2195408 | 3/1974 | France . |
| 2621529 | 4/1989 | France . |

OTHER PUBLICATIONS

French Counterpart Patent Search Report.

*Primary Examiner*—C. L. Albritton
*Attorney, Agent, or Firm*—Body, Vickers & Daniels

[57] ABSTRACT

An installation for marking the surface of a cheese or meat product including a laser beam marking device, a removable mask and a laser marking station with a horizontally-arranged linear table supporting a carriage and reflector device for turning the laser beam. A drive support tray for supporting the product and a suction port at the marking station down stream of a coating station for coating the product to be marked with flour.

20 Claims, 10 Drawing Sheets

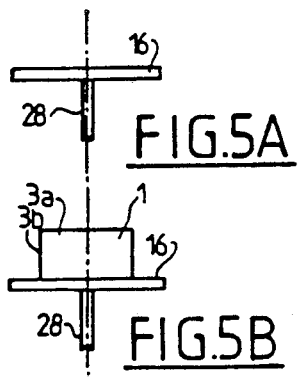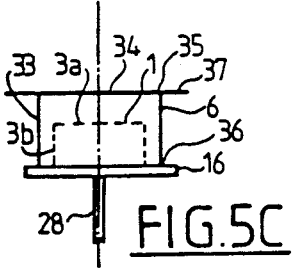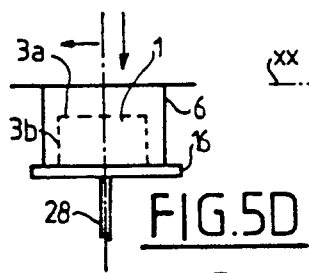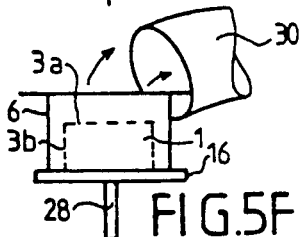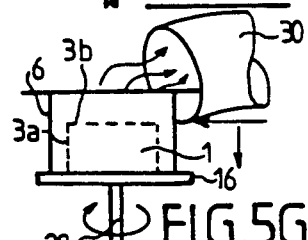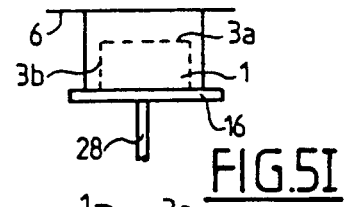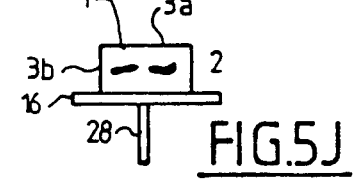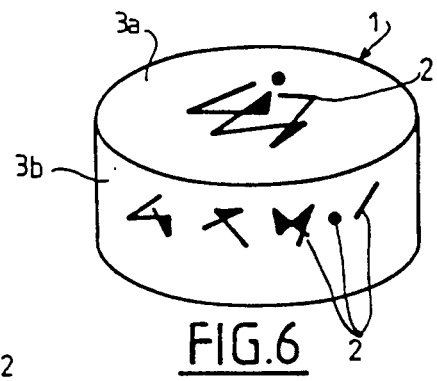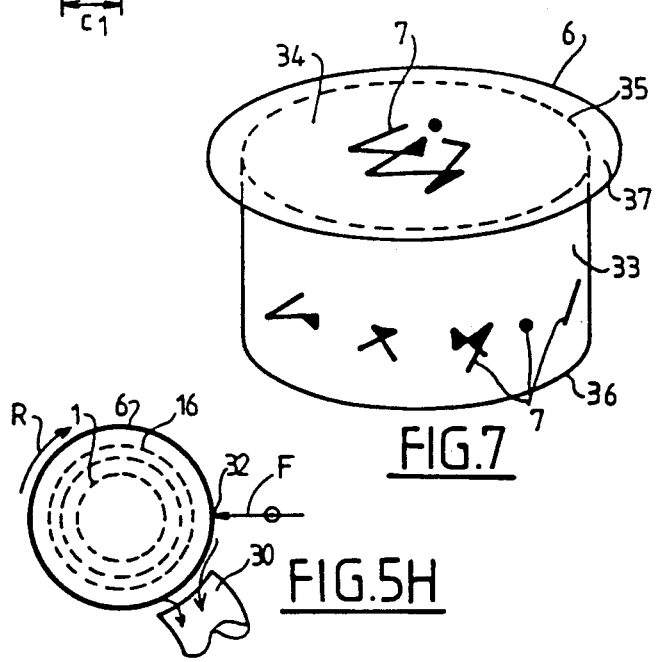

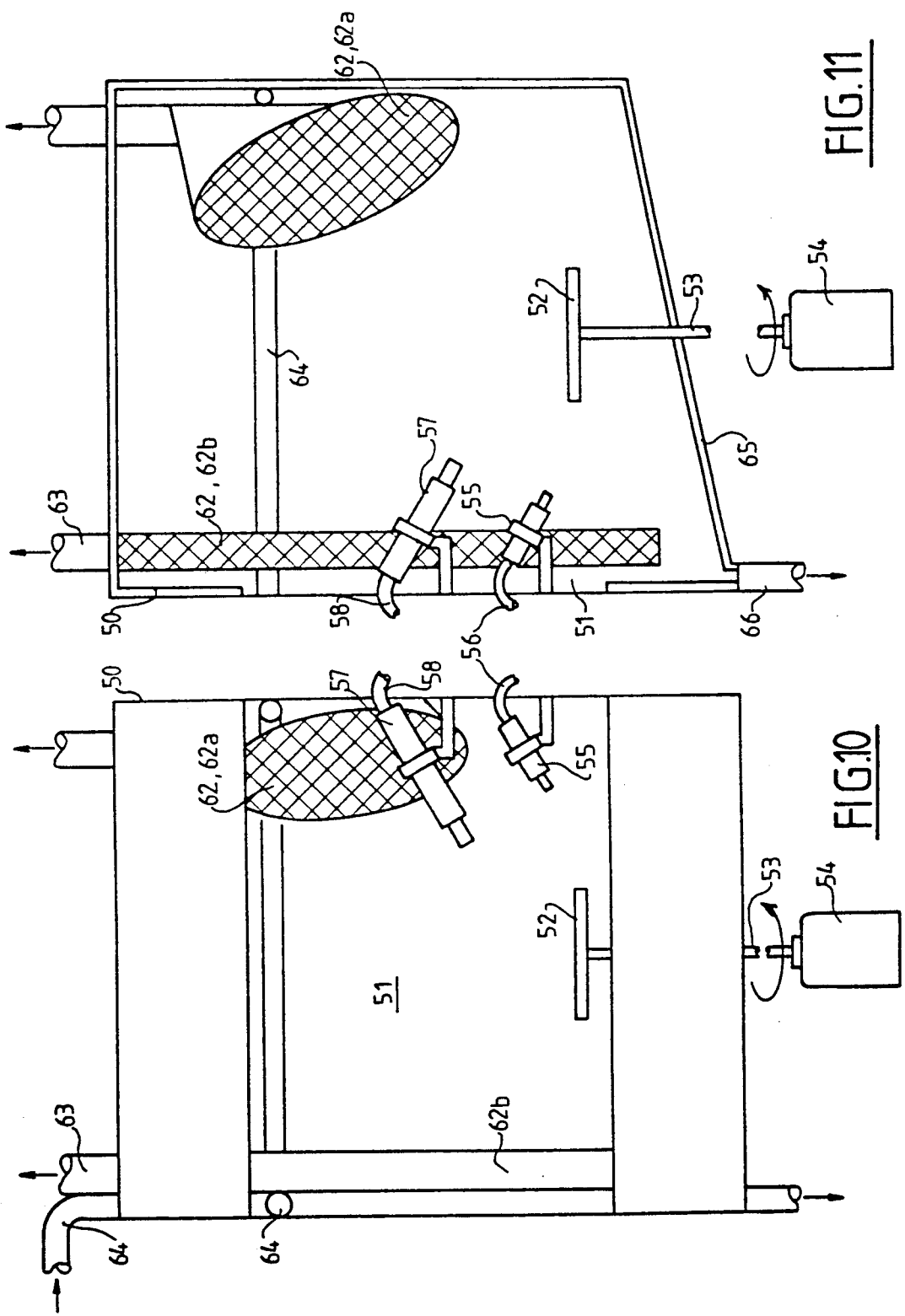

INSTALLATION FOR THE LASER MARKING OF THE SURFACE OF A CHEESE OR DELICATESSEN FOOD PRODUCT

The invention relates to an installation for the laser marking of the surface of a cheese or meat product.

BACKGROUND OF THE INVENTION

Already known (the document FR 2,621,529) is a process for making a mark on the surface of a food product to be marked, especially of the cheese or meat type, by thermal treatment, in which the food product to be treated, bare and of firm consistency, is subjected directly to at least one laser beam, the radiation characteristics of which are selected and adjusted to ensure a localised heating of the food product to be treated, capable, on the one hand, of burning the food product, without substantially vaporising it, at least essentially at the point of impact of the laser beam and, on the other hand, of limiting the heating of the food product to be treated to the immediate vicinity of the impact.

A laser marking apparatus for carrying out the process comprises means for supporting the bare food product to be marked, a laser capable of emitting a laser beam in the direction of the supporting means, and means capable of obtaining a transverse sweep, combined with a relative longitudinal stepwise sliding, of the laser beam in relation to the supporting means of the food product to be marked. According to one possible alternative embodiment, the apparatus has a mask intended to be interposed in the path of the laser beam and possessing an aperture, the edge of which corresponds to the contour of the mark to be made.

The object of the present invention is to provide an installation for the laser marking of the surface of a cheese or delicatessen food product, making it possible to carry out the process mentioned above. This installation according to the invention allows the process to be carried out on an industrial scale, thus implying conditions of productivity, of ease of use, of safety, etc., such as are generally required in industrial processes.

In the present instance, in fact, various problems arise, particularly the fact that the mark generally involves the upper face and lateral face of the food product; the need to have the possibility of treating a large number of food products in succession; the need to have the possibility of grasping the mask in an appropriate way in order to put it in place and remove it; safety; the production of a mark with a clean contour, etc.

Already provided are systems making it possible to orient laser beams so as to direct the laser beam in a suitable way according to the particular intended use. Reference may be made, for example, to the document EP 0,178,011 relating to a robot having a laser beam. However, a device such as this robot is certainly inappropriate for the laser marking of a cheese or a meat product.

SUMMARY OF THE INVENTION

The installation according to the invention, of the type mentioned above, therefore comprises at least one laser marking station having a horizontal linear table supporting a carriage mounted horizontally slidably along an axis xx; means for receiving the laser beam coming from the laser beam and for returning this beam along the axis xx in the front direction, forming a laser-beam projection assembly; a first device for turning the laser beam vertically downwards, carried frontally by the carriage on the axis xx, so as to receive the laser beam exiting from the projection assembly; a second device for returning the laser beam, on the one hand along an axis x'x' parallel to and located vertically below and in line with the axis xx, and on the other hand the front direction, arranged proximally and frontally in relation to the table; a horizontal tray for supporting the food product to be marked, mounted pivotably about a vertical axis located substantially in the mid-plane xxx'x' located distally in relation to the table and substantially coplanar with the second return device; means for driving the supporting tray to pivot about its axis; means for driving the carriage to slide along its sliding axis xx between a distal position and a proximal position, where the first return device is located vertically above and vertically in line with the supporting tray and with the second return device; and finally, means of controlling the means for driving the tray and the means for driving the carriage to slide along its axis xx.

According to another characteristic, the invention also comprises at least one station for coating the food product to be marked with flour or its equivalent, located upstream of the marking station and comprising an enclosure having a front orifice for loading and unloading; a supporting tray mounted pivotably about a vertical axle and located in the lower part of the enclosure; means for driving the supporting tray to pivot about its axle; at least one glaze-spraying gun associated with glaze delivery means, located at a higher level than the supporting tray and directed towards this; at least one gun for spraying flour or its equivalent, associated with means for delivering flour or its equivalent, located at a higher level than the supporting tray and directed towards this; and finally, means of controlling the driving of the supporting tray and of the gun for spraying glaze and flour or its equivalent.

BRIEF DESCRIPTION OF THE DRAWINGS

Other characteristics of the invention will emerge from the following description with reference to the accompanying drawings in which:

FIGS. 5a to 5j are ten diagrammatic views illustrating the successive steps of laser marking.

FIG. 6 is a diagrammatic perspective view of a food product marked according to the invention.

FIG. 7 is a diagrammatic perspective view of a mask of the installation according to the invention.

FIGS. 10 and 11 are two diagrammatic views, from the front and from the side respectively, of a coating station of an installation according to the invention.

DESCRIPTION OF THE PREFERRED EMBODIMENTS

Figure 1:
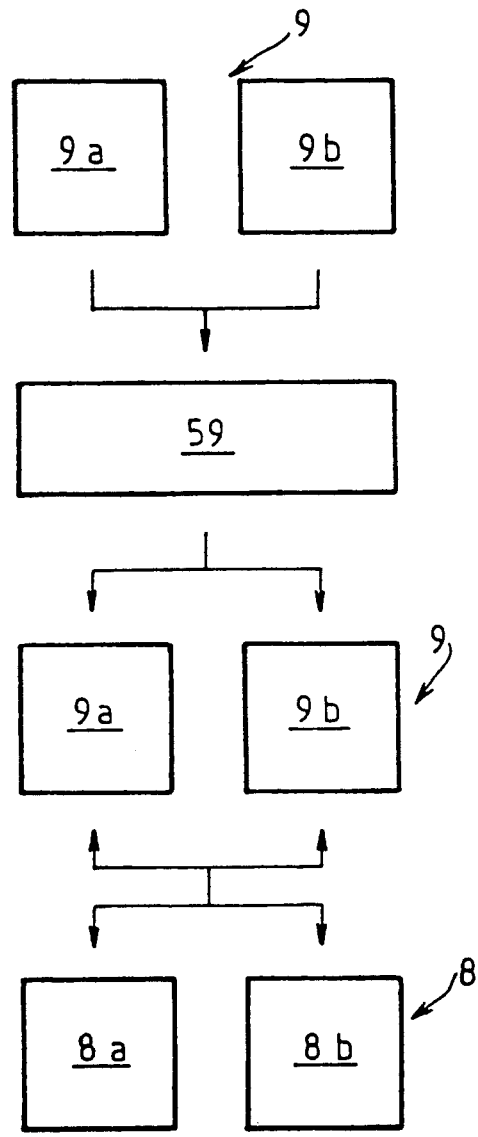
FIG. 1 is a diagrammatic top view illustrating a laser marking installation according to the invention.

The invention relates to an installation for marking the surface of a cheese or meat product (1), for the purpose of making one or more surface marks (2) on the outer face of this food product.

The installation according to the invention is intended for carrying out the process described in the document FR 2,621,529, to which document express reference is made.

More particularly, as the preferred and most sophisticated use of the invention, the installation is intended for making a plurality of marks (2) on the upper face (3a) and on the lateral face (3b) respectively of the food product (1). In the figures, the food product (1) is shown with a general flattened cylindrical shape. It goes without saying, however, that other shapes are also possible.

The installation comprises a laser (4), means (5) for supporting the food product (1) and means capable of obtaining a transverse sweep, combined with a relative longitudinal sliding, of the laser beam F coming from the laser (4) in relation to the supporting means (5), more particularly in relation to the food products (1) which they support. The installation also comprises a removable mask (6) intended to be interposed in the path of the laser beam F and having apertures (7), the edges of which correspond to the contours of the mark (2) to be made.

Basically, the installation comprises at least one and usually a plurality of laser marking stations (8). By laser marking station (8) is meant an assembly forming a unit in which food products (1) can be treated in succession in such a way that the mark or marks obtained by means of the laser beam (F) and the mask (6) are made on their faces, (3a), 3b). To allow the invention to be put into practice on an industrial scale, there is preferably a plurality of laser marking stations (8), (8), etc., which will be referred to again later.

Furthermore, the installation comprises a station (9) for coating the food product (1) to be marked with flour or its equivalent (10). This coating station (9) is located upstream of the marking station or marking stations (8). This means that a food product (1) first passes to a coating station (9) and then subsequently to a laser marking station (8). By coating station (9) is meant an assembly in which a food product (1) can be treated so as to be coated appropriately on its outer faces with flour or its equivalent (10). It was found, in fact, that the quality of the coating of the food product (1) with flour or its equivalent (10) had an influence on the quality of the laser marking made subsequently.

For reasons of industrial productivity, there is preferably a plurality of coating stations (9a), 9b) (see FIG. 1).

Reference is now made more particularly to FIGS. 2 to 9 which illustrate the laser marking.

A laser marking station (8) comprises a horizontal linear table (11) supporting a carriage (12) mounted horizontally slidably along an axis xx. It subsequently comprises means for receiving the laser beam coming from the laser (4) and for reflecting this beam along the axis xx in the front direction, forming as a whole a laser-beam projection assembly (13). The station (8) also has a first device (14) for reflecting the laser beam vertically downwards, carried frontally by the carriage (12) on the axis xx, so as to receive the laser beam exiting from the projection assembly (13).

A second device (15) for reflecting the laser beam, on the one hand along an axis x'x' parallel to and located vertically below and in line with the axis xx, and on the other hand in the front direction, is arranged proximally and frontally relation to the table (11) (see FIG. 4).

A horizontal tray (16) for supporting the food product (1) to be marked is mounted pivotably about a vertical axis zz located substantially in the mid-plane xxx'x', this supporting tray (16) being located distally and frontally in relation to the table (11), whilst at the same time being substantially coplanar with the second return device (15).

The distal position is the furthest away from the table (11) in the front direction, whilst the proximal direction is longitudinally the nearest to the table.

The laser marking station (8) also comprises means (17) for driving the supporting tray (16) to pivot about its axis zz; means for driving the carriage to slide along its axis xx, these not being shown explicitly in the drawings because they are integrated both in table (11) and in the carriage (12); and finally, means (not shown) of controlling the means (17) for driving the supporting tray (16) and the means for driving the carriage (12) to slide along its axis xx.

In the most sophisticated instance where the mark (2) located on the upper face 3A extends, where appropriate, in a direction parallel to the axis xx, but also in an orthogonal direction parallel to the axis yy, for this purpose the linear table (11) supports the projection assembly (13) and the carriage (12) in such a way that the latter is mounted horizontally slidably along an axis yy perpendicular to the axis xx. The installation then has means for driving the carriage (12) and the projection assembly (13) to slide along the axis yy. These driving means are not shown in the figures because they are integrated in the linear table (11), in the carriage (12) and in the assembly (13). Moreover, the control means then also control the means for driving the projection assembly (13) and for driving the carriage (12) to slide along the axis yy.

Preferably, as stated above, the installation comprises a plurality of laser marking stations (8), (8). This applies to FIGS. 2 and 3 which show two laser marking (8a), (8b). In this case, the various laser marking stations (8a), (8b) have a linear table (11), a carriage (12), a laser-beam projection assembly (13) and a first single reflector device (14) common to all the laser marking stations. The installation comprises as many second reflector devices (15) as supporting trays (16) as stations. Each of the laser marking stations (8a), (8b) has a midplane which is a vertical plane containing the axes xx and zz. The various mid-planes corresponding to the various stations (8a), (8b) are parallel to and spaced from one another along the common axis yy. In this preferred alternative embodiment, it will be appreciated that the sliding axis yy serves, on the one hand, for making the laser marking of a mark (2) on the upper face (3a) of a food product (1), this mark extending parallel to the axis yy, and, at the same time, for transferring the integral assembly formed by the carriage (12) and the projection assembly (13) from one station to another.

In this alternative embodiment, there is preferably a third device (18) for returning the laser-beam carried by the projection assembly (13), this reflector device (18) receiving an incident laser beam coming from the laser (4) along the axis yy and making it possible, at the exit, to reflect the laser beam (F) along the axis xx towards the first reflector device (14). The incident laser beam comes from a protective tube mounted at the exit of the laser (4) and arranged laterally in relation to the table (11). In this alternative embodiment, the incident laser beam in the protective tube (19) can remain stationary as a whole, the installation being designed to allow marks to be made on the upper and lateral faces (3a), (3b) of a food product (1) and even of a plurality of food products in the various laser marking stations (8a), (8b), as already mentioned.

Reference is now made to this alternative embodiment, as illustrated in the drawings and being the most sophisticated embodiment of the installation, from which other simpler embodiments can be inferred. To make it more convenient to describe the laser marking stations (8a), (8b), reference is made, in space, to three identifying directions, namely a so-called longitudinal direction, horizontal and parallel to an axis xx, a so-called transverse direction, horizontal and parallel to an axis yy and a so-called vertical direction, parallel to the axis zz.

The linear table (11) extends essentially transversely. It is supported by a mount (20). This linear table (11) has guides and driving means, such as pulleys, racks, etc.

A horizontal stage (21) is mounted on the linear table (11) slidably in the transverse direction yy. Mounted side by side on this stage (21) are, on the one hand, fastened rigidly, the projection assembly (3) and, on the other hand, mounted longitudinally slidably, a linear board (22) extending in the longitudinal direction. This linear board (22) has sliding and driving members of the same general type as those of the table (11). In its free front end part, the linear board (22) forms the carriage (12).

By front part is meant that which, in a longitudinal direction, is on the side where the supporting tray or supporting trays (16) are located. The opposite part, on the other side of the linear table (11), is called the rear part.

The projection assembly (13) comprises an outer housing (23) fastened to the stage (21) equipped with a lateral orifice (24) located opposite the protective tube (19) and, on its front face, with a projection tube (25) adjacent to a front orifice (26). The two orifices (24), (26) communicate via the space within the housing (23), in which is mounted a member (27) for reflecting the laser beam, such as a vertical plane mirror inclined at 45° to the axes xx and yy.

The first reflector device (14) likewise consists of a plane mirror extending parallel to the axis yy and at 45° relative to the axes xx and zz. The second laser-beam reflector device (15) likewise consists of a mirror having some concavity so as to focus the laser beam towards the food product (1) to be marked. The general plane of the mirror of the second reflector device (15) extends substantially parallel to that of the first reflector device, whilst at the same time being offset relative to the latter downwards and towards the linear table (11).

It goes without saying that the mirrors forming the reflector members or devices (14), (15), (27) can be produced in any suitable way. For example, there can be a polished metal surface suitably cooled to avoid being damaged or destroyed by the laser beam. Preferably, these members or devices are mounted by means of a quick-assembly device, so that they can easily be replaced if necessary.

The second reflector device (15) is arranged in relation to the linear table (11) in such a way that the incident vertical laser beam reaching it does not interfere with the other component members of the installation.

The supporting tray (16) is, for example, a circular tray driven by a motor (17) placed underneath it. Such a tray (16) is fastened to an axle (28) carried by bearings (29) forming part of a stand of the laser marking station (8). By a substantially coplanar arrangement of the supporting tray (16) and of a second reflector device (15) is meant that the transverse horizontal centre line of the second reflector device (15) is located horizontally in line with the mask (6) when it is placed on the supporting tray (16), as described in more detail later.

The supporting tray (16) or the various supporting trays of the various laser marking stations (8), (8) are arranged at the front in the installation so as to allow access.

Figure 2:
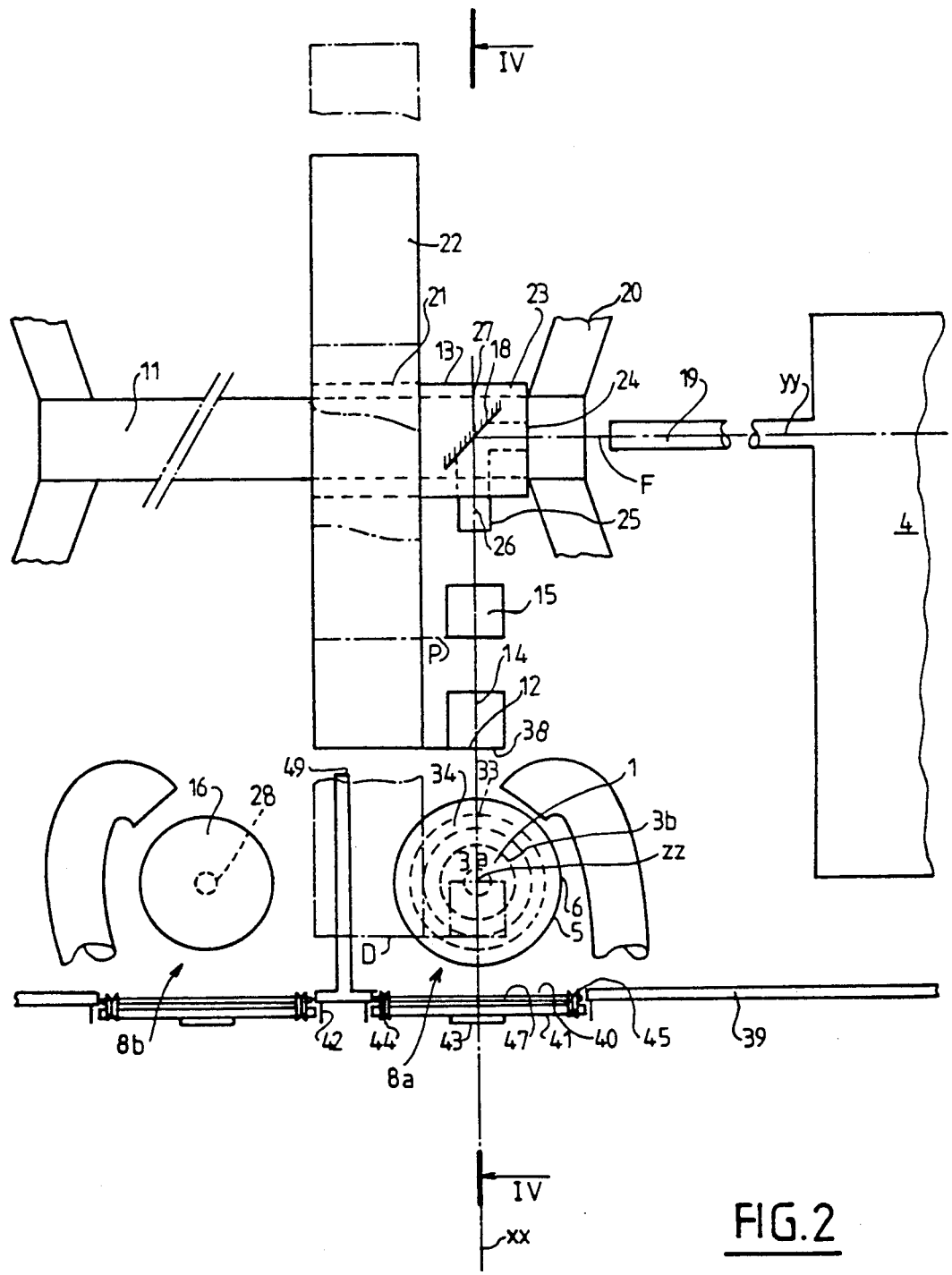
FIG. 2 is a diagrammatic top view of a laser marking assembly.
Figure 3:
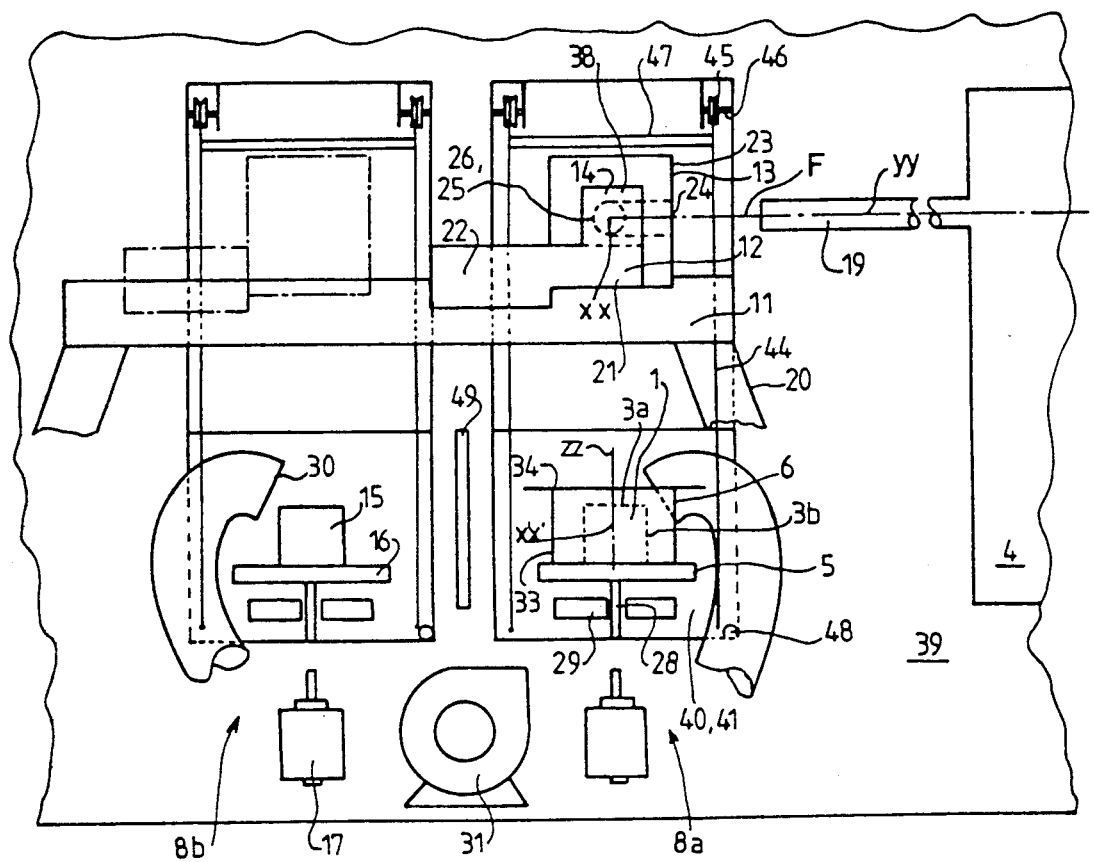
FIG. 3 is a diagrammatic front elevation view of the laser marking assembly of FIG. 2.
Figure 9:
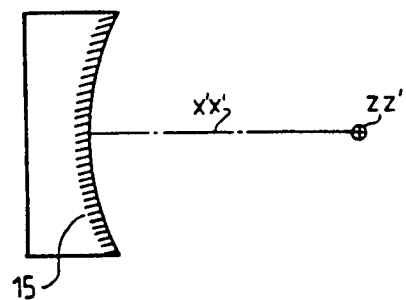
FIG. 9 is a diagrammatic sectional view along the line IX—IX of FIG. 4, illustrating one embodiment of the laser-beam return device.
Figure 4:
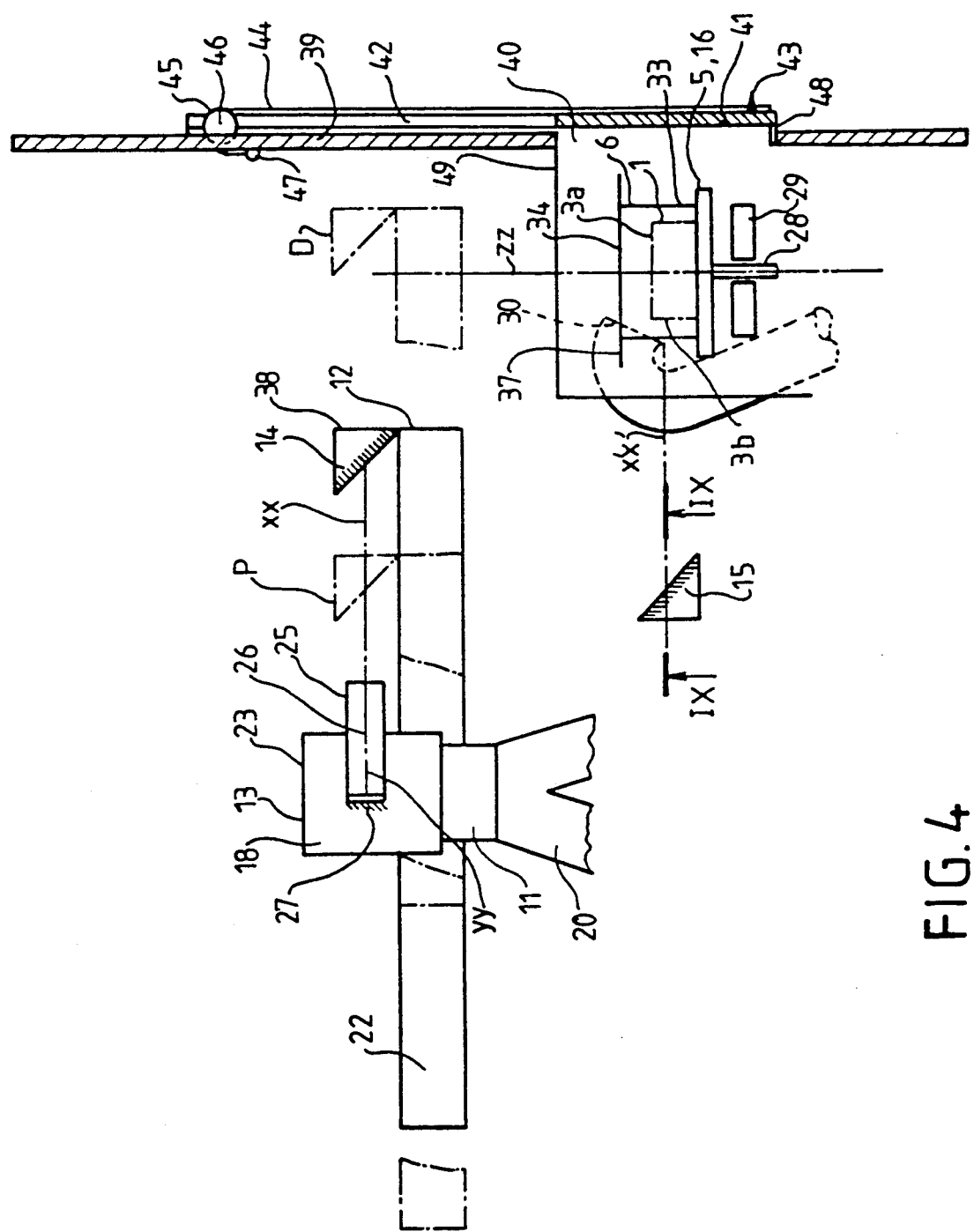
FIG. 4 is a diagrammatic sectional view along the line IV—IV of FIG. 2.

The means for driving the carriage (12) to slide along its sliding axis xx make it possible for the carriage (12) to slide between two end positions, namely a distal position and a proximal position designated respectively by (D) and (P) in FIGS. 2 and 4. These notions of distal and proximal are to be understood in relation to the table (11).

In the distal position, the first return device (14) is located vertically above and in line with the supporting tray (16) or with the food product (1) or with the mask (6), especially its upper face. In the proximal position, the first reflector device is located vertically above and in line with the second reflector device (15).

According to the invention, associated with at least one supporting tray is a suction port (30) for the vapours and smoke which can occur as a result of the laser marking, this port being intended to be coupled to a discharge suction device (31). Preferably, at least one suction port (30) is provided for each supporting tray (16). Such a suction port (30) is, in the first place, located at a horizontal level higher than the supporting tray (16) and, where appropriate, the mask (6) which it supports. In the second place, a suction port (30) is located in a horizontal plane and offset relative to the supporting tray (16), to allow the mask (6) to be put in place and removed parallel to the axis zz of the supporting tray (16). In other words, the suction port (30) is not located exactly in line with the supporting tray (16). In the third place, the suction port (30) is offset downstream of the impact of the laser beam (F) on the mask (6) and/or the food product (1) and in relation to the direction of rotation of the supporting tray (16). This arrangement can be seen clearly in FIG. 5h which shows (32), the impact of the laser beam on the mask (6) and that a zone first subjected to the impact of the laser beam (32) subsequently passes into the vicinity of the suction port (30) in view of the direction of rotation of the supporting tray (16) represented by the arrow (R).

Reference is now made to FIG. 7 which shows one possible embodiment of a mask (6). Such a mask comprises, on the one hand, a lateral wall (33) of general cylindrical or prismatic shape, of which the axis is substantially coaxial with the axis zz of this supporting tray (16), when the mask (2) is in position on the supporting tray (16). The mask (6) comprises, on the other hand, an upper horizontal wall (34) fastened to the upper free edge (35) of the lateral wall (33), the lower free edge (36) of which is intended to rest on the supporting tray (16) when the mask (6) is in position. The notions of upper, lateral, lower, etc. refer, here, to the situation where the mask (6) is in the normal position of use on the supporting tray (16). Such a mask then forms a kind of bell covering the food product (1), the apertures (7) being made in the walls (33), (34).

Preferably, the upper horizontal wall (34) has a radial extension (37) directed outward, especially in the form of a cylindrical ring, which makes it possible simultaneously to assist the dissipation of heat caused by the laser impact and, on the other hand, to grasp the mask (6), especially manually, without getting burnt.

For safety reasons, there is advantageously fastened to the carriage (12) at the front in relation to the first return device (14), a protective plate (38) made of a material which can prevent the passage of the laser beam (F), this plate being of sufficient size and being vertically arranged perpendicularly to the longitudinal direction.

In an industrialised installation operated by persons entrusted with the handling operations, there is at the front a vertical protective wall (39) made of a material which can retard the passage of the laser beam (F) and extending sufficiently both in the transverse direction and in the vertical direction. One or more orifices (40) are made in the vertical wall (39), especially opposite each marking station (8a), (8b), meaning that there are then as many orifices (40) as there are marking stations (8). One orifice (40) makes it possible to introduce and extract the food product (1) to be marked and the mask (6). This orifice (40) can be closed by a door (41). The door (41) is for example, mounted vertically slidably on and against the vertical wall (39) by means of lateral sliding members (42). The door (41) has an actuating handle (43), especially in its lower part. Preferably, the door (41) is mounted in equilibrium, and for this purpose there can be fastened to it lateral cables (44) extending vertically upwards and passing, in the upper part, over grooved return pulleys (45) of horizontal and transverse axis (46). At their other end, on the other side of the pulleys (45), the cables (44) support a counterweight (47) which thus ensures the balancing of the door (41).

Preferably, there is a safety device (48) carried by the wall (39) and the door (41), in such a way that the marking station can function only when the door (41) is closed. There can likewise be separating partitions (49) between the supporting trays (16), said partitions and extending vertically perpendicularly to the transverse direction.

Preferably, there is also a second safety device preventing the laser from functioning if the mask (6) is not in place.

The functioning of a laser marking station, as just described, will now be dealt with, and for this purpose reference is made to FIGS. 5a to 5j and 8a to 8d.

The assembly is initially at a standstill Preferably, the carriage (12) is in the proximal position, to allow convenient access to the supporting tray (16). Alternatively, in so far as there is a long spacing distance between the first reflector device (14) and the supporting tray (16) so as to allow convenient access to the supporting tray (16), the carriage (12) is in the distal position from the outset.

The user can open the door (41), This operation is made all the easier because there are means for balancing this (44), (45), (46) and (47). The presence of the device (48), and indeed even of the second safety device already mentioned, prevents any problem when the door (41) is open. The supporting tray (16) is thus free in this state (FIG. 5A). The user can put in place the food product (1) with its free upper face (3a) on top (FIG. 5b). He can subsequently place the mask (6) in the manner of a bell, on the supporting tray (16) and round the food product (1). This operation is made all the easier because the mask (6) has a radial extension (37). If appropriate, marks or a groove are provided on the supporting tray (16), making it possible to position the mask (6) perfectly in relation to the supporting tray (16).

Figure 8A:
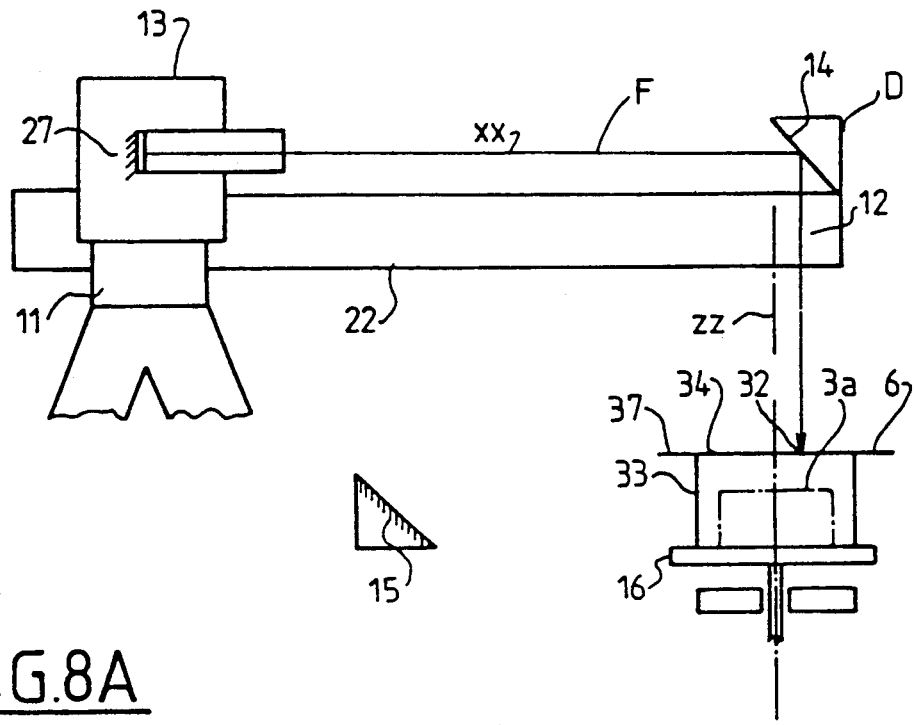
FIG. 8a, 8b, 8c, 8d are four diagrammatic views, similar to that of FIG. 4, illustrating the characteristic steps in the use of the installation and relative positions of its component members.
Figure 8B:
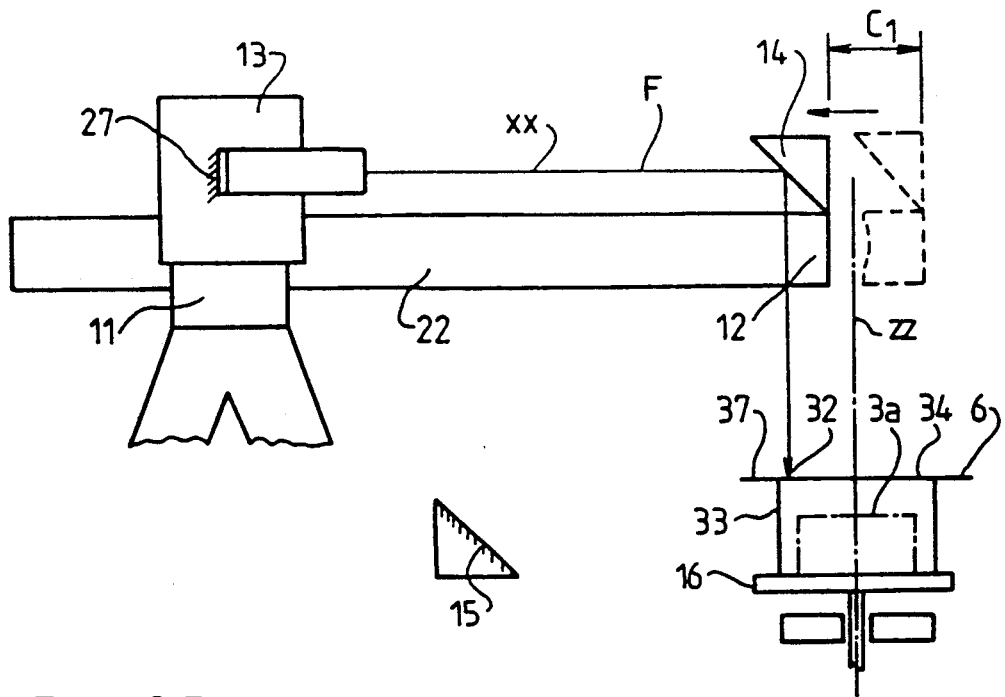

There is thus the situation as shown in FIGS. 5d and 8A. The laser beam F coming from the laser (4) first follows a transverse path of axis yy through the tube (19) and is then reflected along the axis xx by the reflector member (27). It then strikes the first reflector device (14) which deflects the laser beam vertically downwards parallel to the axis zz of the supporting tray (16). Because the carriage (12) is in its distal position, the laser beam (F) reflected by the first device (14) meets the upper horizontal wall (34) of the mask (6). The driving and control means are designed so that, with the supporting tray (16) then being immobile, the carriage (12) is moved to slide from its end distal position along the axis xx alternately in one direction and the other over a small stroke at most equal to that of the mask (6) and, together with the projection assembly (13), along the axis yy over a stroke in successive steps which is likewise small and at most equal to that of the mask (6). This stroke of the carriage (12) along the axis xx is represented in FIG. 8b by the distance C1. It also appears in FIG. 5e. The stroke along the axis yy is represented in FIG. 5e by the distance C2. The movements of the carriage (12), combined along the axis xx and along the axis yy, are executed at such a speed that an overlapping sliding impact can be obtained, as described in the document FR 2,624,529.

During this combined movement, the laser beam F strikes either the upper horizontal wall (34), at the point where it is without an aperture (7), or the upper face (3a) of the product (1), leaving a mark (2). The production of the mark (2) causes release of smoke and vapours which can escape from the confined space defined by the mask (6) placed on the supporting tray (16) by means of the apertures (7). These vapours and smoke are removed by the suction port (30) and eliminated by means of the device (31) (FIG. 5F).

Figure 8C:
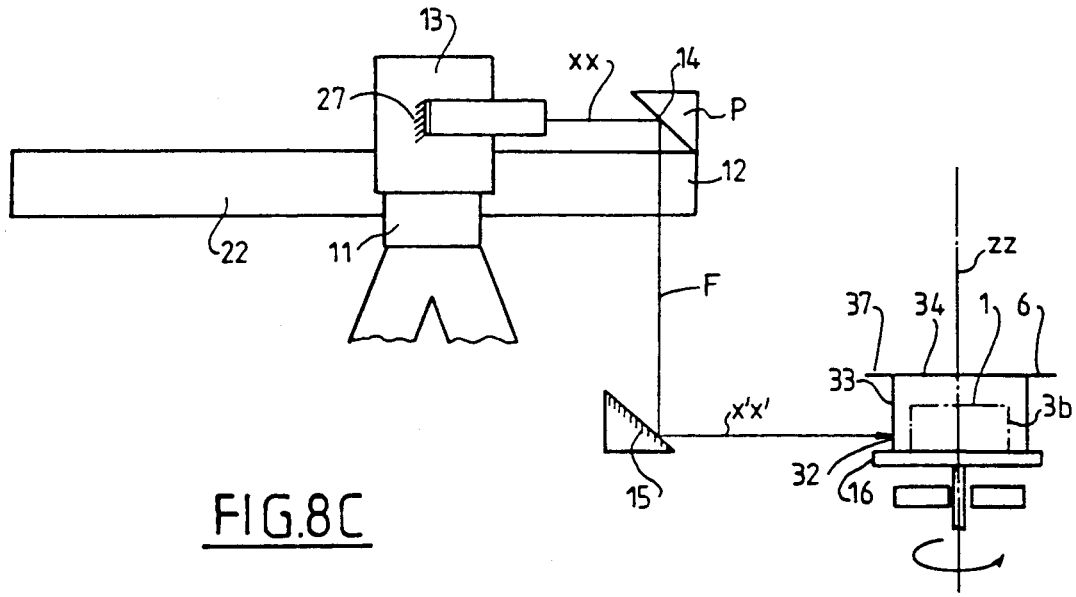

It is then possible to control the movement of the carriage (12) in order to bring it into its proximal position (FIG. 8c). In this situation, the laser beam reflected vertically downwards by the first reflector device (14) strikes the second reflector device (15), so that the laser beam is returned horizontally along the axis x'x' located vertically below and in line with the axis xx (or more precisely its extension).

Figure 8D:
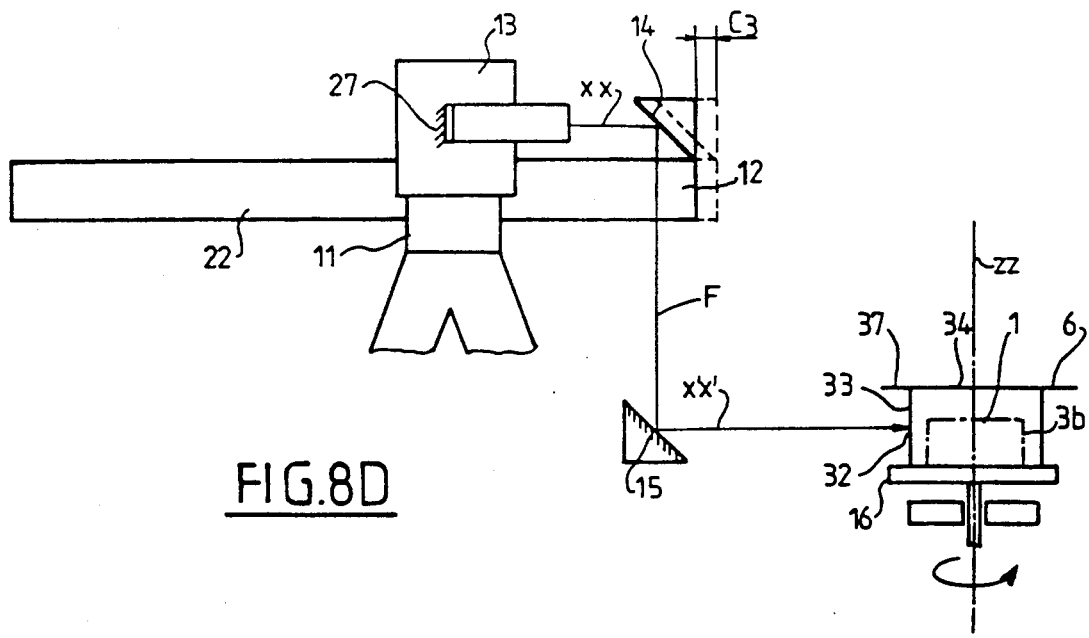

The relative positions of the second reflector device (15) and of the supporting tray (16) and the dimensions of the mask (6), especially in the axle direction along the axis zz, are such that the laser beam in the axis x'x' meets the lateral wall (33) of the mask (6). The carriage (12) is then moved from its proximal position P to slide along the axis xx over a small stroke represented in FIG. 8d by the distance C3, in such a way that the impact of the laser beam reflector by the first reflector device (14) slides along the second reflector device (15) and passes from its lower part to its upper part, or vice versa. It follows from this that the axis x'x' is moved between two end positions, namely lower (FIG. 8c) and upper (FIG. 8d). This stroke in the axle direction is such that it makes it possible to cover the entire axial height of the apertures (7) made in the lateral wall (33) of the mask (6). Because the supporting tray (16) executes a sufficient number of revolutions, the impact (32) of the laser beam can be an impact within the meaning of the document FR 2,621,529, capable of making the desired marks (2) over the entire periphery of the food product (1).

During this laser marking of the lateral face (3b) of the food product (1), there is likewise, via the apertures (7), a release of smoke and vapours which are recovered and eliminated by the suction port (30).

Once the marking has been carried out, the support tray (16) can be stopped, and the carriage (12) can be maintained in its proximal position, with the proviso of what was said above. The door (41) can be opened. The user can remove the mask (6), without risking burning himself, by means of the radial extension (37) and then the food product (1) having the marks (2) (FIGS. 5i and 5j).

FIG. 6 illustrates such a marked product, the marks made being purely indicative and with the possibility of including dot, line or surface marks.

It is then possible to prepare the station for a subsequent operation. If appropriate, the various stations (8a), (8b) are in different states of progress of the process, so that, for example, during the marking period of one station (8a), the user puts in place or, on the contrary, removes the food product (1) and the mask (6) from the adjacent station (8b).

Reference is now made to FIGS. 1 and 10 to 13 as regards a station for coating with flour or its equivalent (10).

Such a coating station is located upstream of a laser marking station (8), and it comprises an enclosure (50) of general parallelepipedal shape, having a front orifice (51) allowing the loading and unloading of the food product (1) to be coated. Mounted in the enclosure (50) is a supporting tray (52) mounted pivotably about a vertical axle (53). The supporting tray (52) is carried by means of bearings (not shown) and is arranged in the lower part of the enclosure (50).

Means (54) for driving the supporting tray (52) to pivot about its axle (53) are provided especially underneath the enclosure (50). These can be, for example, a motor or a geared motor.

The coating station also comprises at least one glaze-spraying gun (55) associated with glaze delivery means (56). The gun (55) is located at a higher level than that of the supporting tray (52) and is generally directed towards this.

The coating station also possesses at least one gun (57) for spraying flour (10) or its equivalent. Associated with this gun (57) are means (58) for delivering flour or its equivalent (10). The gun (57) is located at a higher level than the supporting tray (52) and is directed towards this. Preferably, the two guns (55) and (57) are located in the immediate vicinity of one another, their axes being substantially parallel to one another or converging slightly in the direction of the supporting tray (52).

The coating station (9) also possesses means of controlling the driving of the supporting tray (54) and of the guns (55), (57).

Figure 12A:
FIGS. 12a to 12j are ten diagrammatic views illustrating the successive steps of the coating.
Figure 12D:
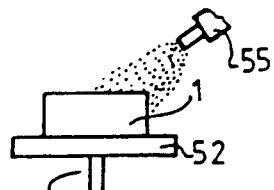
Figure 12B:
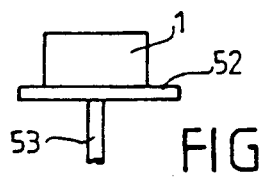
Figure 12E:
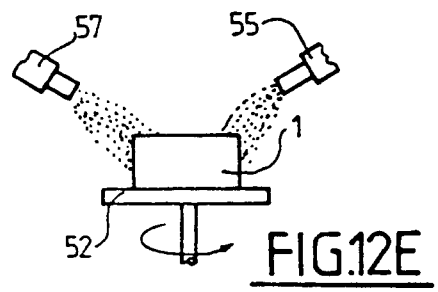
Figure 12C:
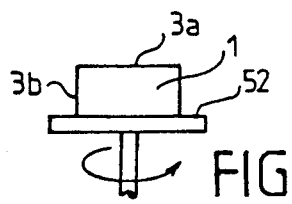
Figure 12F:
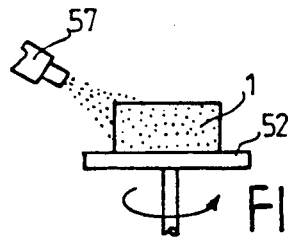
Figure 12G:
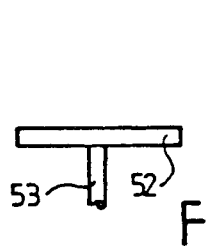

These control means (not shown) are arranged so that successively: with the supporting tray (52) initially being at a standstill and empty of any food product (1) to be coated (FIG. 12A), the user can place on it a food product (1) to be coated (FIG. 12B). The supporting tray (52) is then driven in rotation about its axle (53) by the driving means (54) (FIG. 12C). Then, successively, with the supporting tray (52) still pivoting about its axle (53), first glaze alone is sprayed (FIG. 12D) and then glaze and flour or its equivalent (10) are sprayed simultaneously (FIG. 12e), and then finally flour or its equivalent alone is sprayed (FIG. 12f). In FIG. 12e, the spraying of glaze and the spraying of flour are shown diagrammatically in two opposite directions only, to make it easier to understand the functioning. In practice, the glaze spray stream and the flour spray stream are intimately mixed with one another as a result of the proximity and parallel or slightly convergent nature of the guns (55), (57). Subsequently, the supporting tray (52) can be brought to a standstill and the food product (1) thus coated removed (FIG. 12g).

Figure 12H:
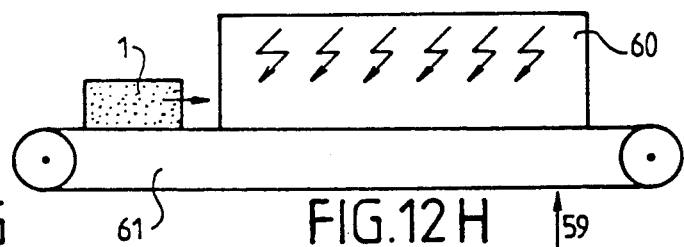
Figure 12I:
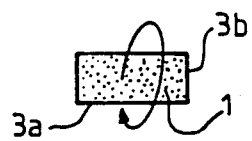
Figure 12J:
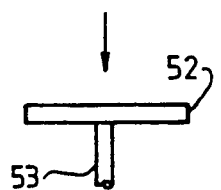

If appropriate, there can be a drying station (59) consisting, for example, of an infrared tunnel (60), through which passes the food product (1) supported, for example, by an endless conveyor belt (61) (FIG. 12h).

Where appropriate, the food product (1) thus coated on its preceding upper face and its lateral face can be overturned (FIG. 12i), the previous upper face becoming the current lower face, and vice versa, and the coating operation can be recommenced in such a way that the entire food product (1) is coated.

Preferably, the coating station also has a suction port (62) located in the enclosure (50) and coupled to a discharge suction device (63). For example, there are at least one substantially horizontal suction port (62a) facing downwards and at least one substantially vertical suction port (62b) extending over virtually the entire height of the enclosure (50).

Likewise preferably, a coating station (9) also possesses a device (64) for spraying water especially on the inner faces of the vertical walls of the enclosure (50). In this case, the bottom (65) of the enclosure (50) is inclined, and it has a low point where there is a discharge (66) for the streaming water coming from the device (64).

Figure 13:
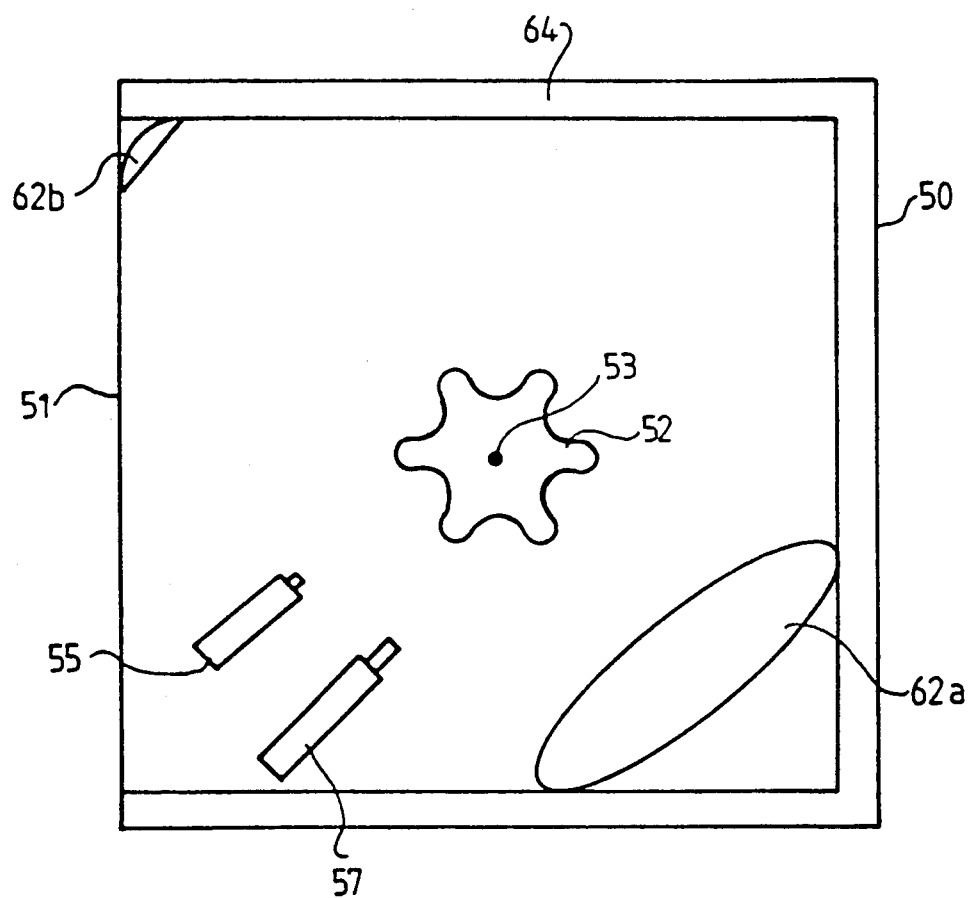
FIG. 13 is a diagrammatic top view of the coating station of FIGS. 10 and 11.

As can be seen in FIG. 13, the suction ports (62a), (62b) are preferably diametrically opposite one another, and the supporting tray (16) has the general shape of a star, so that most of the outer face of the food product (1) is free and therefore coated with glaze and with flour or its equivalent (10). Moreover, the tray (16) makes it easier to pick up the cheese.

The invention can have many other embodiments.

I claim:

1. An installation for marking the surface of a cheese or a meat product, which comprises a laser, means for supporting the food product to be marked, means capable of obtaining a transverse sweep, combined with a relative longitudinal sliding, of the laser beam in relation to said supporting means, and a removable mask intended to be interposed in the path of said laser beam and having apertures, the edges of which correspond to the contours of the mark to be made, characterized in that it has at least one marking station, comprising:

a horizontal linear table supporting a carriage mounted horizontally slidably along an axis xx;

means for receiving said laser beam coming from said laser and for reflecting said beam along said axis xx in the front direction, forming a laser-beam projection assembly;

a first reflector device for reflecting said laser beam vertically downwards, carried frontally by said carriage on said axis xx, so as to receive said laser beam exiting from said projection assembly;
a second reflector device for reflecting said laser beam, on the one hand along an axis x'x' parallel to and located vertically below and in line with said axis xx, and on the other hand the front direction, arranged proximally and frontally in relation to said table;
a horizontal tray for supporting said food product to be marked, mounted pivotably about a vertical axis located substantially in the mid-plane xxx'x', located distally and frontally in relation to said table and substantially coplanar with the second reflector device;
means for driving the supporting tray to pivot about its axis;
means for driving said carriage to slide along said sliding axis xx between a distal position and a proximal position where said first reflector device is located vertically above and in line with said supporting tray and with said second reflector device respectively;
means of controlling the means for driving said tray and the means for driving said carriage to slide along said axis xx.

2. The installation as claimed in claim 1, wherein the table (11) supports the projection assembly (13) and the carriage (12) which are mounted horizontally slidably along an axis yy perpendicular to the axis xx, and it possesses means for driving the carriage (12) and the projection assembly (13) to slide along its axis yy, the control means likewise controlling the means for driving the projection assembly and for driving the carriage to slide along the axis yy.

3. The installation as claimed in claim 1, which comprises a plurality of marking stations (8a, 8b) with a linear table (11), a projection assembly (13), a carriage (12), a first single common reflector device (14) and as many second reflector devices (15) as supporting trays (16) as stations (8a, 8b), the mid-planes of which are parallel to one another along the axis yy.

4. The installation as claimed in claim 1, which possesses a third reflector device (18) for reflecting the laser beam, carried by the projection assembly (13) and receiving an incident laser beam coming from the laser (4) along the axis yy and making it possible, at the exit, to reflect the laser beam (F) along the axis xx towards the first reflector device (14), the incident laser beam coming from a protective tube (19) mounted at the exit of the laser (4) and arranged laterally in relation to the table (11).

5. The installation as claimed in claim 1, which possesses, associated with at least one supporting tray (16), a port (30) for the suction of vapours and smoke, coupled to a discharge suction device (31).

6. The installation as claimed in claim 5, wherein the suction port (30) is, in the first place, located at a horizontal level higher than the supporting tray (16) and the mask (6) which it possesses, in the second place, in a horizontal plane offset relative to the supporting tray (16), to allow the mask (6) to be put in place and removed parallel to the axis (zz) of the supporting tray (16), and in the third place, downstream of the impact (32) of the laser beam (F) in relation to the direction of rotation (R) of the supporting tray (16).

7. The installation as claimed in claim 1, wherein the means for driving the supporting tray (16), the carriage (12) and the projection assembly (13) and the control means are designed in order to, successively and for a given marking station (8):
bring the carriage (12) into a distal position;
with the supporting tray (16) being immobile, move the carriage (12) to slide from its end distal position along the axis xx alternately in one direction and the over over a small stroke at most equal to that of the mark (6) and, together with the projection assembly (13), along the axis yy over a stroke in successive [lacuna] at most equal to that of the mask (6);
bring the supporting tray (16) to pivot about its axis (28), zz;
move the carriage (12) from its proximal position to slide along the axis xx over a small stroke at most equal to the axial height of the mask (6).

8. The installation as claimed in claim 1, wherein a mask (6) comprises, on the one hand, a lateral wall (33) of general cylindrical or prismatic shape, the axis of which is intended to be substantially coaxial with that of the supporting tray (16), and, on the other hand, an upper horizontal wall (34) fastened to the upper free edge (35) of the lateral wall (33) intended to rest by means of its lower free edge (36) on the supporting tray (16).

9. The installation as claimed in claim 8, wherein the upper horizontal wall (34) has an outward radial extension (37) making it possible simultaneously to assist the dissipation of heat and to grasp the mask (6).

10. The installation as claimed in claim 1, wherein the second reflector device (15) is a mirror having some concavity.

11. The installation as claimed in claim 1, which possesses, fastened to the carriage (12) at the front in relation to the first reflector device (14), a protective plate (38) made of a material which can prevent the passage of the laser beam (F).

12. The installation as claimed in claim 1, which possesses, at the front, a vertical protective wall (39) made of a material which can retard the passage of the laser beam (F), and having an orifice (40) for introducing and extracting the food product (1) to be marked and the mask (6), which can be closed by means of a door (41) having a safety device (48) and mounted with balancing (44, 45, 46, 47).

13. The installation as claimed in claim 1, which comprises at least one station (9) for coating the food product (1) to be marked with flour or its equivalent (10), located upstream of the marking station (8) and comprising:
an enclosure (50) having a front orifice (51) for loading and unloading;
a supporting tray (52) mounted pivotably about a vertical axle (53) and located in the lower part of the enclosure (50);
means (54) for driving the supporting tray (52) to pivot about its axle (53);
at least one glaze-spraying gun (55) associated with glaze delivery means (56), located at a higher level than the supporting tray (52) and directed towards this;
at least one gun (57) for spraying flour or its equivalent (10), associated with means for delivering flour or its equivalent, located at a higher level than the supporting tray (52) and directed towards this;
and means of controlling the driving of the supporting tray (52) and of the guns (55, 57) for spraying glaze and flour or its equivalent (10).

14. The installation as claimed in claim 13, wherein the control means are designed in order to ensure, successively and when the supporting tray (52) is pivoting about its axle (53), the spraying first of glaze alone, then of glaze and of flour or its equivalent (10) simultaneously, then finally of flour or its equivalent (10) alone.

15. The installation as claimed in claim 13, which also possesses at least one suction port (62) located in the enclosure (50) and coupled with a discharge suction device (63).

16. The installation as claimed in claim 15, which possesses at least one substantially horizontal suction port (62a) facing downwards and at least one substantially vertical suction port (62b).

17. The installation as claimed in claim 13, which possesses a device (64) for spraying water on the inner faces of the walls of the enclosure (50).

18. The installation as claimed in claim 17, wherein the bottom (65) of the enclosure (50) is inclined and has a low point where a discharge (66) for streaming water is located.

19. The installation as claimed in claim 13, wherein the supporting tray (52), as seen in elevation, has the general shape of a star.

20. The installation as claimed in claim 13, wherein a coating station (9) is associated with at least one drying station (59) consisting of an infrared tunnel (60, 61).

* * * * *